(12) United States Patent
Ooyama

(10) Patent No.: US 6,866,606 B2
(45) Date of Patent: Mar. 15, 2005

(54) CONTINUOUSLY VARIABLE TRANSMISSION SYSTEM FOR VEHICLES

(75) Inventor: Kazuo Ooyama, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/278,880

(22) Filed: Oct. 24, 2002

(65) Prior Publication Data

US 2003/0083170 A1 May 1, 2003

(30) Foreign Application Priority Data

Oct. 25, 2001 (JP) .......................................... 2001-327661
Dec. 25, 2001 (JP) .......................................... 2001-391790

(51) Int. Cl.$^7$ .............................................. F16H 37/02
(52) U.S. Cl. ........................ 475/216; 475/208; 475/211; 475/212; 475/217; 475/218
(58) Field of Search ................................ 475/216, 208, 475/211, 212, 217, 218

(56) References Cited

U.S. PATENT DOCUMENTS

| | | | |
|---|---|---|---|
| 6,217,473 B1 * | 4/2001 | Ueda et al. .................. | 475/216 |
| 6,520,884 B2 * | 2/2003 | Ooyama .................... | 475/216 |
| 6,561,941 B2 * | 5/2003 | Nakano et al. ............. | 475/214 |
| 6,616,564 B2 * | 9/2003 | Shibukawa .................. | 475/216 |
| 2003/0060318 A1 * | 3/2003 | Sumi .......................... | 475/216 |

FOREIGN PATENT DOCUMENTS

GB        2100372 A    * 12/1982   ........... F16H/37/02

* cited by examiner

*Primary Examiner*—Rodney H. Bonck
*Assistant Examiner*—David D. Le
(74) *Attorney, Agent, or Firm*—Westerman, Hattori, Daniels & Adrian, LLP

(57) ABSTRACT

A continuously variable transmission system designable compact in size and manufacturable at a reduced cost by reducing the number of component parts and securing a maximum transmission ratio width. A toroidal continuously variable transmission has an input member connected to an output shaft of a prime mover, and an output member for outputting rotation of the input member at a continuously variable transmission ratio. A planetary gear mechanism has a first element connected to the output member, a second element connected to drive wheels, and a third element. A first clutch establishes and releases connection between the first element and the second element. A first gear train and a second gear train having a larger gear ratio, are arranged between the output shaft and the third element in parallel. Second and third clutches establish and release respective connections of first and second gear trains.

15 Claims, 5 Drawing Sheets

CONTINUOUSLY VARIABLE TRANSMISSION SYSTEM FOR VEHICLES

BACKGROUND OF THE INVENTION

1. Field of the Invention

This invention relates to a continuously variable transmission system for vehicles, which is constructed by combining a toroidal continuously variable transmission and a planetary gear mechanism.

2. Description of the Prior Art

Conventionally, a continuously variable transmission system for vehicles, of the above-mentioned kind, is disclosed e.g. in the publication of Japanese Patent No. 2778038. This continuously variable transmission system includes a toroidal continuously variable transmission, and first and second planetary gear mechanisms. The toroidal continuously variable transmission has an input shaft connected to an engine, and an output shaft connected to sun gears of the first and second planetary gear mechanisms. The first planetary gear mechanism has a planet carrier provided with a first clutch for connecting the planet carrier to a fixing member, and a ring gear connected to an output shaft of the continuously variable transmission system via a planet carrier of the second planetary gear mechanism. Further, the second planetary gear mechanism has a ring gear provided with a brake for reverse travel.

The toroidal continuously variable transmission has the input shaft thereof connected to an auxiliary drive shaft via two gears. The auxiliary drive shaft is connected to a first sleeve via two gears. The first sleeve is rotatably supported on the output shaft of the continuously variable transmission system. A second clutch is provided between the first sleeve and the ring gear of the second planetary gear mechanism. Further, the planet carrier of the first planetary gear mechanism is connected to a second sleeve via two gears. The second sleeve is rotatably supported on the auxiliary drive shaft. A third clutch is provided between the second sleeve and the auxiliary drive shaft.

In the continuously variable transmission system, when the vehicle is standing, the toroidal continuously variable transmission (hereinafter referred to as "the toroidal transmission" is controlled to a minimum speed transmission ratio (gear ratio), and the first to third clutches and the brake are disengaged or released to thereby hold the output shaft in a stationary state. From this state, when the first clutch is engaged to fix the planet carrier of the first planetary gear mechanism, the ring gear of the first planetary gear mechanism rotates in a direction opposite to the direction of rotation of the output shaft of the toroidal transmission, that is, in the same direction as the direction of rotation of the input shaft of the toroidal transmission, and the planet carrier of the second planetary gear mechanism and the output shaft of the continuously variable transmission system connected thereto also rotate in the same direction, whereby the continuously variable transmission system is placed in a first mode for forward travel. In this first mode, if the transmission ratio of the toroidal transmission is changed in a speed-increasing direction, the rotational speed of the sun gear of the first planetary gear mechanism is increased, and accordingly, the rotational speed of the ring gear of the same and hence the rotational speed of the output shaft of the continuously variable transmission system is increased, whereby the continuously variable transmission system delivers torque at an increased rotational speed.

Next, when the transmission ratio of the toroidal transmission reaches a maximum speed transmission ratio in the first mode, the first clutch is disengaged, and the second clutch is engaged, whereby the system is placed in a second mode for forward travel. In this second mode, part of torque of the input shaft is transmitted to the ring gear of the second planetary gear mechanism via the auxiliary drive shaft and the second clutch, whereby this ring gear is rotated in the same direction as the direction of rotation of the input shaft, and at the same time part of the torque of the input shaft is transmitted to the sun gear of the second planetary gear mechanism via the toroidal transmission, whereby this sun gear is rotated in a direction opposite to the direction of rotation of the input shaft. In this state, if the transmission ratio of the toroidal transmission is changed in a speed-decreasing direction, the rotational speed of the sun gear of the second planetary gear mechanism is decreased, and accordingly, the rotational speed of the planet carrier of the second planetary gear mechanism and hence the rotational speed of the output shaft of the continuously variable transmission system is increased, whereby the continuously variable transmission system delivers torque at a further increased rotational speed.

Then, when the transmission ratio of the toroidal transmission reaches the minimum speed transmission ratio in the second mode, the second clutch is disengaged and at the same time the third clutch is engaged, whereby the system is placed in a third mode for forward travel. In this third mode, part of the torque of the input shaft is transmitted to the planet carrier of the first planetary gear mechanism via the auxiliary drive shaft and the third clutch, whereby this planet carrier is rotated in the same direction as the direction of rotation of the input shaft, and at the same time part of the torque of the input shaft is transmitted to the sun gear of the first planetary gear mechanism via the toroidal transmission, whereby this sun gear is rotated in a direction opposite to the direction of rotation of the input shaft. In this state, if the transmission ratio of the toroidal transmission is changed in the speed-increasing direction, the rotational speed of the sun gear of the first planetary gear mechanism is increased, and accordingly the rotational speed of the ring gear of the same is increased, whereby the continuously variable transmission system delivers torque at a further increased rotational speed.

Further, if the brake is operated from the standing state of the vehicle, the ring gear of the second planetary gear mechanism is fixed and at the same time the sun gear of the same is driven for rotation by the output shaft of the toroidal transmission, so that the planet carrier of the second planetary gear mechanism and hence the output shaft of the continuously variable transmission system are rotated in the same direction as the direction of rotation of the output shaft of the toroidal transmission, that is, in a direction opposite to the direction of rotation of the input shaft of the toroidal transmission. This places the system in a reverse travel mode.

However, the conventional continuously variable transmission system necessitates two sets of planetary gear mechanisms, as described above, in order to realize the three (first to third) modes for forward travel. This increases the number of component parts of the system and manufacturing costs, and makes it impossible to design the system compact in size. Further, the system necessitates the reverse mode as a separate mode, in addition to the three modes. To implement the reverse mode, a brake for reverse travel is necessitated, which further increases the number of component parts and makes the system complicated in construction.

Another conventional continuously variable transmission system for vehicles, of the above-mentioned kind, has been proposed e.g. in Japanese Laid-Open Patent Publication (Kokai) No. 11-257449. This continuously variable transmission system is directed to prevention of excessive tilting of power rollers of a toroidal continuously variable transmission. This toroidal transmission includes an input disc rigidly fitted on an input shaft thereof, an output disc rotatably supported on the input shaft and arranged in a manner opposed to the input disc, and a pair of power rollers in abutment with mutually-opposed surfaces of the input and output discs. The pair of power rollers are supported on a pair of vertically extending trunnions, respectively, such that they are rotatable about a common roller axis orthogonal to the input shaft. Further, the pair of trunnions have upper ends and lower ends thereof supported by an upper link and a lower link, respectively, such that each trunnion is rotatable about a trunnion axis. Each trunnion is configured to be movable along the trunnion axis. By moving the pair of trunnions along the respective trunnion axes, the roller axis of the power rollers is displaced with respect to the rotational axis of the input and output discs, so that the pair of power rollers are rotated about the trunnions axes, respectively, by forces acting on the input and output discs and forces acting on the respective power rollers along the trunnions axes. As a result, the directions and angles of tilting of the pair of power rollers are controlled i.e. changed in a manner synchronous with each other, and the transmission ratio of the toroidal transmission is continuously changed according to the directions and angles of tilting of the pair of power rollers thus controlled.

Further, a pair of stoppers are arranged at respective predetermined locations close to each portion of the upper link for supporting an associated one of the trunnions so as to prevent the power rollers from being excessively tilted in a speed-increasing or speed-decreasing direction. Each trunnion is formed with a pair of receiving portions in a manner associated with the pair of stoppers. When the power rollers are tilted to a maximum speed position (OD end), one receiving portion of each trunnion is brought into abutment with the associated stopper of the upper link on the higher speed side, or alternatively when the power rollers are tilted to a minimum speed position (LOW end), the other receiving portion of the trunnion is brought into abutment with the associated stopper of the upper link on the lower speed side, whereby the angles of tilting of the power rollers are restricted to prevent the power rollers from being tilted beyond the maximum speed position and the minimum speed position to be detached from the input and output discs.

In the conventional continuously variable transmission system described above, however, the angle of tilting of the power rollers are restricted by causing the receiving portions of each trunnion to mechanically abut against the associated stoppers of the upper link, so that a large impact force acts on the upper link. Further, it is difficult to cause a plurality of trunnions to abut against stoppers simultaneously and uniformly due to variations in the machining accuracy, rigidity, assembling accuracy of component parts, which causes only one trunnion to be brought into abutment with the associated stopper. In such a case, an excessively larger force is concentratedly applied to the portion of the upper link supporting the trunnion. This makes it necessary to make robust the upper link and members associated therewith. Further, variations in torque transmitted by each power roller cause slippage of the power rollers, and the slippage causes abnormal generation of heat, early abrasion due to the heat, and the resulting degradation of durability. These inconveniences actually make it impossible to positively set the whole region of transmission ratios available from the continuously variable transmission to the range of transmission ratios for actual use, even if the stoppers are provided.

SUMMARY OF THE INVENTION

It is a first object of the invention to provide a continuously variable transmission system for vehicles, which can be constructed compact in size and manufactured at a reduced cost by reduction of the number of component parts thereof and secure a maximum range of transmission ratios.

It is a second object of the invention to provide a continuously variable transmission system for vehicles, which is capable of preventing power rollers of a continuously variable transmission from being excessively tilted, without using mechanical stoppers, to thereby enhance durability of the transmission, and maximize the range of transmission ratios available from the transmission.

To attain the first object, according to a first aspect of the invention, there is provided a continuously variable transmission system for a vehicle, comprising:

a toroidal continuously variable transmission having an input member connected to an output shaft of a prime mover, and an output member for outputting rotation of the input member at a continuously variable transmission ratio;

a planetary gear mechanism having a first element connected to the output member of the toroidal continuously variable transmission, a second element connected to drive wheels, and a third element;

a first clutch for establishing and releasing connection between the first element and the second element of the planetary gear mechanism;

a first gear train having a first gear ratio and arranged between the output shaft of the prime mover and the third element of the planetary gear mechanism, for transmitting rotation of the output shaft of the prime mover to the third element of the planetary gear mechanism;

a second clutch for establishing and releasing at least one of connection between the first gear train and the output shaft of the prime mover and connection between the first gear train and the third element of the planetary gear mechanism;

a second gear train having a second gear ratio larger than the first gear ratio of the first gear train and arranged between the output shaft of the prime mover and the third element of the planetary gear mechanism in parallel with the first gear train, for transmitting the rotation of the output shaft of the prime mover to the third element of the planetary gear mechanism; and a third clutch for establishing and releasing at least one of connection between the second gear train and the output shaft of the prime mover and connection between the second gear train and the third element of the planetary gear mechanism.

According to this continuously variable transmission system, for instance, if the third clutch is engaged and at the same time the first and second clutches are disengaged (IVT mode), the first element of the planetary gear mechanism connected to the output member of the continuously variable transmission is driven for rotation via the continuously variable transmission, and at the same time the third element is driven for rotation via the second gear train. In this case, by setting a predetermined relationship in advance between the second gear ratio of the second gear train and a gear ratio of the first to third elements of the planetary gear mechanism, it is possible to inhibit the second element from rotation when the transmission ratio of the continuously variable transmission is controlled to a predetermined intermediate transmission ratio, that is, the continuously variable transmission system can be configured to have an IVT (infinitely variable transmission) function. Therefore, if the transmission ratio of the continuously variable transmission is controlled to the predetermined intermediate transmission ratio by the above setting, the drive wheels connected to the second element are inhibited from rotation to maintain the vehicle in a standing state. From the standing state of the vehicle, if the transmission ratio of the continuously variable transmission is changed in a speed-increasing direction, as the rotational speed of the first element connected to the continuously variable transmission is increased, the second element whose rotation has been inhibited starts to be rotated in an opposite direction to the direction of rotation of the first element. This causes the drive wheels to rotate in a reverse travel direction to cause reverse travel of the vehicle. On the other hand, from the above standing state of the vehicle, if the transmission ratio of the continuously variable transmission is changed in a speed-decreasing direction, inversely to the above case, as the rotational speed of the first element is decreased, the second element whose rotation has been inhibited starts to be rotated in the same direction as the direction of rotation of the first element. This causes the drive wheels to rotate in a forward travel direction to cause forward travel of the vehicle.

In the above IVT mode, when the transmission ratio of the continuously variable transmission is changed in the speed-decreasing direction until the vehicle is accelerated up to a first predetermined speed, the first clutch is engaged and at the same time the third clutch is disengaged (direct mode). In the direct mode, since the second and third clutches are disengaged, the torque from the prime mover is transmitted to the first element of the planetary gear mechanism only via the continuously variable transmission. Further, the first clutch is engaged to thereby integrate the first element and the second element with each other to lock the planetary gear mechanism, whereby the drive wheels are directly driven for rotation by the continuously variable transmission. Accordingly, in this state, if the transmission ratio of the continuously variable transmission is changed in the speed-increasing direction, the continuously variable transmission system delivers torque at a rotational speed increased in proportion thereto to further accelerate the vehicle.

In the above direct mode, when the transmission ratio of the continuously variable transmission is changed in the speed-increasing direction to accelerate the vehicle up to a second predetermined speed higher than the above first predetermined speed, the second clutch is engaged and at the same time the first clutch is disengaged (torque split mode). In the torque split mode, the first element of the planetary gear mechanism is driven for rotation via the continuously variable transmissions and at the same time the third element is driven for rotation via the first gear train having a first gear ratio smaller than the second gear ratio of the second gear train due to the engagement of the second clutch. In this state, if the transmission ratio of the continuously variable transmission is changed in the speed-decreasing direction, the rotational speed of the second element is increased in accordance with reduction of the rotational speed of the first element connected to the continuously variable transmission, whereby the continuously variable transmission system delivers torque at a further increased rotational speed to further accelerate the vehicle.

As described above, according to the continuously variable transmission system of the first aspect of the invention, the three transmission modes of the IVT mode, the direct mode, and the torque split mode can be implemented by one planetary gear mechanism. Further, in the IVT mode, the vehicle can be caused to stop, start reverse travel, and start forward travel, which makes it possible to dispense with a reverse brake or the like, whereby the number of component parts of the system can be reduced in comparison with the conventional system. This makes it possible to construct the continuously variable transmission system compact in size and manufacture the same at a reduced cost.

Preferably, a total transmission ratio from the output shaft of the prime mover to the third element of the planetary gear mechanism via the first gear train, and a total transmission ratio from the output shaft of the prime mover to the first element of the planetary gear mechanism via the toroidal continuously variable transmission at a maximum speed transmission ratio are configured to be approximately equal to each other.

According to this preferred embodiment, due to the above configuration, in the direct mode, by switching from the direct mode to the torque split mode when the transmission ratio of the continuously variable transmission is increased to become close to the maximum speed transmission ratio, it is possible to smoothly switch from the direct mode to the torque split mode such that there is no difference in rotational speed of the third element before and after the switching. Further, it is possible to make use of the continuously variable transmission until the transmission ratio thereof is close to the maximum speed transmission ratio in the direct mode and start the torque split mode when the transmission ratio of the continuously variable transmission is close to the maximum speed transmission ratio. Hence, the continuously variable transmission can be made use of to such an extent that the transmission ratio thereof becomes close to a high-speed side limit of the range (corresponding to the transmission ratio width) of available transmission ratios in both of the direct mode and the torque split mode. Therefore, it is possible to secure a wider range of transmission ratios of the whole continuously variable transmission system.

Preferably, a total transmission ratio from the output shaft of the prime mover to the third element of the planetary gear mechanism via the second gear train, and a total transmission ratio from the output shaft of the prime mover to the first element of the planetary gear mechanism via the toroidal continuously variable transmission at a minimum speed transmission ratio are configured to be approximately equal to each other.

According to this preferred embodiment, in switching from the IVT mode to the direct mode, it is possible to similarly obtain the advantageous effects as described above as to the case of switching from the direct mode to the torque split mode. More specifically, due to the above configuration, by switching from the IVT mode to the direct mode when the transmission ratio of the continuously variable transmission is close to the minimum speed transmission ratio, the switching of the transmission mode can be smoothly carried out such that there is no difference in rotational speed of the third element before and after the switching. Further, it is possible to make use of the continuously variable transmission until the transmission ratio thereof is close to the minimum speed transmission ratio in the IVT mode and start the direct mode when the transmission ratio of the continuously variable transmission is close to the minimum speed transmission ratio. Hence, the continuously variable transmission can be made use of to such an extent that the transmission ratio thereof becomes close to a low-speed side limit of the range (corresponding to the transmission ratio width) of available transmission ratios in both of the IVT mode and the direct mode. Therefore, it is possible to secure a still wider range of transmission ratios of the whole continuously variable transmission system.

More preferably, the variable transmission system includes a connecting mechanism for connecting the output shaft of the prime mover to the second element of the planetary gear mechanism when a rotational speed of the drive wheels becomes higher than a rotational speed which the drive wheels should have when the toroidal continuously variable transmission is at the maximum speed transmission ratio.

More preferably, the continuously variable transmission system includes a connecting mechanism for connecting the output shaft of the prime mover to the second element of the planetary gear mechanism when a rotational speed of the drive wheels becomes lower than a rotational speed which the drive wheels should have when the toroidal continuously variable transmission is at the minimum speed transmission ratio.

Further preferably, the connecting mechanism includes a one-way clutch.

To attain the second object, according to a second aspect of the invention, there is provided a continuously variable transmission system for a vehicle, for transmitting a driving force from a prime mover to drive wheels at a continuously variable transmission ratio, the continuously variable transmission system comprising:

a first driving force transmission path including an output shaft connected to the drive wheels, and a toroidal continuously variable transmission that has power rollers, and outputs the driving force input from the prime mover at a continuously variable transmission ratio achieved by tilting of the power rollers which are rotated, via the output shaft to the drive wheels;

switching means for switching a direction in which the toroidal continuously variable transmission changes the continuously variable transmission ratio, between a speed-increasing direction and a speed-decreasing direction, in at least one of a predetermined speed-increasing range of transmission ratios and a predetermined speed-decreasing range of transmission ratios; and an auxiliary driving force transmission path for connecting the prime mover and the output shaft in at least one of a case where a rotational speed of the output shaft becomes larger than a rotational speed corresponding to a first predetermined transmission ratio of the toroidal continuously variable transmission within the predetermined speed-increasing range and a case where the rotational speed of the output shaft becomes lower than a rotational speed corresponding to a second predetermined transmission ratio of the toroidal continuously variable transmission within the predetermined speed-decreasing range.

According to this continuously variable transmission system, the driving force from the prime mover is input to the toroidal continuously variable transmission, and output at a transmission ratio set at the time by the power rollers of the continuously variable, to the output shaft via the first driving force transmission path and then transmitted to the drive wheels. Further, the direction in which the transmission ratio of the continuously variable transmission is varied is changed by the switching means between the speed-increasing direction and the speed-decreasing direction in at least one of the predetermined speed-increasing range and predetermined speed-decreasing range of transmission ratios of the continuously variable transmission. During execution of the switching, if torque larger than expected acts on the output shaft e.g. due to a sudden change in load on the driving wheels, causing at least one of a case where the rotational speed of the output shaft becomes higher than a rotational speed corresponding to the first predetermined transmission ratio in the predetermined speed-increasing range and a case where the rotational speed of the output shaft becomes lower than a rotational speed corresponding to the predetermined second transmission ratio in the predetermined speed-decreasing range, the auxiliary driving force transmission path connects the prime mover and the output shaft, whereby an amount of torque in excess of the expected amount is transmitted between the prime mover and the output shaft via the auxiliary driving force transmission path.

As described above, since the auxiliary driving force transmission path can be caused to share the amount of torque in excess of the expected amount, it is possible to maintain the balance between input and output rotations of the continuously variable transmission whereby the transmission ratio of the transmission can be maintained within a predetermined range without using mechanical stoppers. This makes it possible to prevent the power rollers from being excessively tilted. As a result, it is possible to prevent an excessively large or varied torque from being applied to the power rollers, and reduce slippage, heat generation, and abrasion caused by such torque to thereby enhance durability of the transmission. Further, the power rollers can be prevented from being excessively tilted in the speed-increasing direction and/or the speed-decreasing direction, so that even if a switching point for switching the direction in which the transmission ratio of the continuously variable transmission is continuously varied between the speed-increasing direction and the speed-decreasing direction in at least one of the predetermined speed-increasing range and predetermined speed-decreasing range of transmission ratios is set to a transmission ratio end which can be set by the continuously variable transmission alone, it is possible to reliably protect a high speed-side end and/or a low speed-side end or components and elements associated with these ends, thereby making it possible to maximize the range of available transmission ratios of the toroidal continuously variable transmission.

For example, the auxiliary driving force transmission path comprises a second driving force transmission path for connecting the prime mover and the output shaft when the rotational speed of the output shaft becomes higher than the rotational speed corresponding to the first predetermined transmission ratio of the toroidal continuously variable transmission within the predetermined speed-increasing range.

According to this preferred embodiment, when the rotational speed of the output shaft becomes higher than the rotational speed corresponding to the first predetermined transmission ratio within the predetermined speed-increasing range, the second driving force transmission path connects the prime mover and the output shaft, whereby an amount of torque in excess of the expected amount of torque can be transmitted between the prime mover and the output shaft via the second driving force transmission path.

Preferably, a total transmission ratio of the second driving force transmission path is configured to be approximately equal to a total transmission ratio of the first driving force transmission path to be assumed when the toroidal continuously variable transmission is at the first predetermined transmission ratio within the predetermined speed-increasing range, and a first one-way clutch is arranged in the second driving force transmission path.

According to this preferred embodiment, if an amount of torque in excess of an expected amount is generated on the high-speed side, the first one-way clutch connects the second driving force transmission path. Thus the connection and disconnection of the second driving force transmission path can be reliably effected by using a mechanical one-way clutch, without any need to execute control operation therefor and by simple construction.

More preferably, the first predetermined transmission ratio is a maximum speed transmission ratio.

For example, the auxiliary driving force transmission path comprises a third driving force transmission path for connecting the prime mover and the output shaft when the rotational speed of the output shaft becomes lower than the rotational speed corresponding to the second predetermined transmission ratio of the toroidal continuously variable transmission within the predetermined speed-decreasing range.

According to this preferred embodiment, when the rotational speed of the output shaft becomes lower than the rotational speed corresponding to the second predetermined transmission ratio within the predetermined speed-decreasing range, the third driving force transmission path connects the prime mover and the output shaft, whereby an amount of torque in excess of the expected amount of torque can be transmitted between the prime mover and the output shaft via the third driving force transmission path.

Preferably, a total transmission ratio of the third driving force transmission path is configured to be approximately equal to a total transmission ratio of the first driving force transmission path to be assumed when the toroidal continuously variable transmission is at the second predetermined transmission ratio within the predetermined speed-decreasing range, and a second one-way clutch is arranged in the third second driving force transmission path.

According to this preferred embodiment, if an amount of torque in excess of an expected amount is generated on the low-speed side, the second one-way clutch connects the third driving force transmission path. Thus, the connection and disconnection of the third driving force transmission path can be reliably effected by using a mechanical one-way clutch, without any need to execute control operation therefor and by simple construction.

More preferably, the second predetermined transmission ratio is a minimum speed transmission ratio.

Preferably, the toroidal continuously variable transmission has an output member for outputting the driving force, and the continuously variable transmission system includes:

a planetary gear mechanism having a first element connected to the output member, a second element connected to the drive wheels, and a third element;

a first clutch for establishing and releasing connection between the first element and the second element of the planetary gear mechanism;

a first gear train having a first gear ratio and arranged between the prime mover and the third element of the planetary gear mechanism, for transmitting the driving force of the prime mover to the third element of the planetary gear mechanism;

a second clutch for establishing and releasing at least one of connection between the first gear train and the prime mover and connection between the first gear train and the third element of the planetary gear mechanism;

a second gear train having a second gear ratio larger than the first gear ratio of the first gear train and arranged between the prime mover and the third element of the planetary gear mechanism in parallel with the first gear train, for transmitting the driving force of the prime mover to the third element of the planetary gear mechanism; and a third clutch for establishing and releasing at least one of connection between the second gear train and the prime mover and connection between the second gear train and the third element of the planetary gear mechanism.

According to this preferred embodiment, by selectively engaging the first to third clutches, the three transmission modes of the IVT mode, the direct mode, and the torque split mode can be implemented by one planetary gear mechanism, which makes it possible to construct the continuously variable transmission system compact in size and manufacture the same at a reduced cost.

The above and other objects, features, and advantages of the invention will become more apparent from the following detailed description taken in conjunction with the accompanying drawings.

DETAILED DESCRIPTION OF PREFERRED EMBODIMENTS

Figure 1:
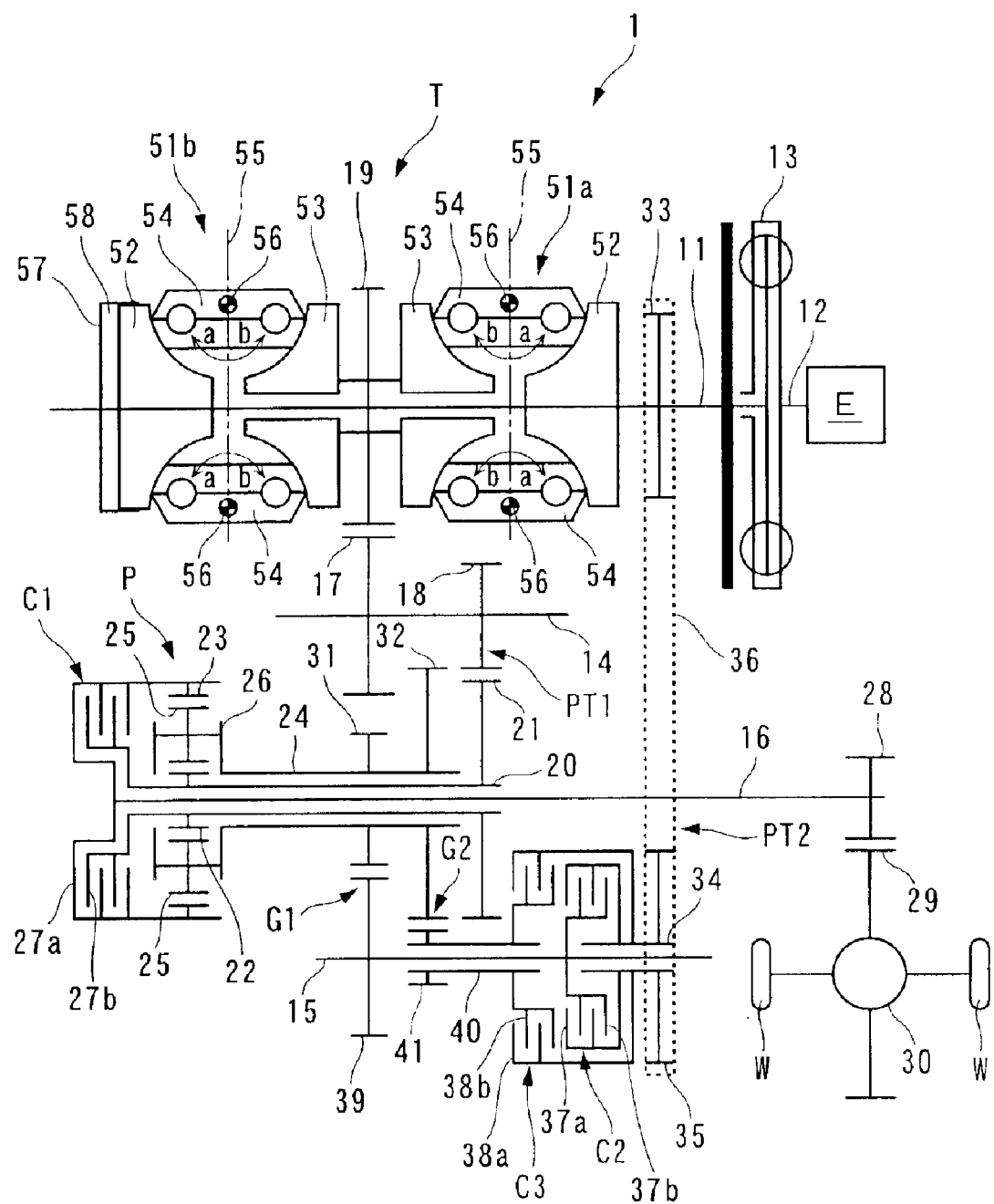
FIG. 1 is a skeleton diagram showing a continuously variable transmission system according to a first embodiment of the invention.

The invention will now be described in detail with reference to the drawings showing preferred embodiments thereof. Referring first to FIG. 1, there is schematically shown a continuously variable transmission system for an automotive vehicle, according to a first embodiment of the invention. The continuously variable transmission system 1 includes a toroidal continuously variable transmission T, a single pinion-type planetary gear mechanism P, a direct clutch C1 (hereinafter referred to as "the first clutch C1", a torque split clutch C2 (hereinafter referred to as "the second clutch C2", and an IVT clutch C3 (hereinafter referred to as "the third clutch C3". Each of the first to third clutches C1 to C3 is formed e.g. by a wet-type multiple disc hydraulic clutch, whose engagement and disengagement is controlled by a hydraulic control circuit, not shown.

The continuously variable transmission T has an input shaft 11 connected to a crankshaft 12 (output shaft) of an internal combustion engine E (hereinafter simply referred to as "the engine E"as a drive source via a double-mass flywheel 13. First and second intermediate shafts 14, 15, and an output shaft 16 are rotatably arranged in parallel with the input shaft 11. The planetary gear mechanism P and the first clutch C1 are arranged on the output shaft 16, and the second and third clutches C2, C3 are arranged on the second intermediate shaft 15 in parallel with each other.

The continuously variable transmission T has first and second continuously variable mechanisms 51a, 51b mounted on the input shaft 11. The first and second continuously variable mechanisms 51a, 51b have constructions approximately identical to each other. The first continuously variable mechanism 51a includes a conical input disc 52 (input member) rigidly fitted on the input shaft 11, an output disc 53 (output member) rotatably supported on the input shaft 11, and arranged in a manner opposed to the input disc 52, and a pair of power rollers 54, 54 each in abutment with mutually-opposed surfaces of the input and output discs 52, 53. The power rollers 54, 54 are rotatably supported on respective trunnions, not shown, such that they are rotatable about a common roller axis 55 orthogonal to the input shaft 11 and at the same time tiltable about respective trunnion axes 56, 56, which are perpendicular to the input shaft 11 and the roller axis 55. Further, the opposed surfaces of the input and output discs 52, 53 are configured to be toroidal curved surfaces such that the respective contact points of the power rollers 54, 54 with the input and output discs 52, 53 are changed as the power rollers 54, 54 tilt about the trunnion axes 56, 56. It should be noted that the directions and angles of tilting of the pair of power rollers 54, 54 are made synchronous with each other in the following manner: The trunnions are moved along the axes 56 thereof by a hydraulic control circuit, not shown, whereby the roller axis 55 which is the rotational axis of the power rollers 54, 54 is displaced with respect to the center of rotation of the input and output discs 52, 53, and the power rollers 54, 54 are rotated about the trunnion axes 56, 56 by forces acting on the input and output discs 52, 53 and forces acting on the rollers 54 along the trunnion axis 55.

The second continuously variable mechanism 51b is arranged in plane symmetry to the first continuously variable mechanism 51a with respect to an output gear 19. The output discs 53, 53 of the first and second continuously variable mechanisms 51a, 51b are integrally formed with each other. The output gear 19 is integrally formed with the output discs 53, 53 at a central location. Further, the input disc 52 of the second continuously variable mechanism 51b is splined to the input shaft 11 in an unrotatable and axially movable manner, and slidably fitted in a cylinder 57 coaxial with the input shaft 11. When hydraulic pressure is supplied to an oil chamber 58 formed between the input disc 52 and the cylinder 57, this input disc 52 and the output discs 53, 53 of the first and second continuously variable mechanisms 51a, 51b are urged toward the input disc 52 of the first continuously variable mechanism 51a, whereby slippage of the power rollers 54, 54 is prevented.

According to the continuously variable transmission T constructed as above, when each of the power rollers 54, 54 is tilted from a speed-keeping position shown in FIG. 1 in a direction indicated by an arrow "a", the contact point of each power roller 54 with the input disc 52 is shifted outward in a radial direction of the input shaft 11, and the contact point of each power roller 54 with the output disc 53 is shifted inward in the radial direction of the input shaft 11. Hence, the rotational speed of the input disc 52 is increased to transmit rotation having the increased rotational speed to the output disc 53, whereby the transmission ratio of the continuously variable transmission T is continuously changed in a speed-increasing direction. Inversely, when each of the power rollers 54, 54 is tilted in a direction indicated by an arrow "b", opposite to the above-mentioned direction, the respective contact points of each power roller 54 with the associated input and output discs 52, 53 are shifted in opposite directions to the above directions, so that the rotational speed of the input disc 52 is decreased to transmit rotation having the decreased rotational speed to the output disc 53, whereby the transmission ratio of the continuously variable transmission T is continuously changed in a speed-decreasing direction. In the present embodiment, for instance, the maximum speed transmission ratio RATIO1 of the continuously variable transmission T is set to 0.415, and the minimum speed transmission ratio RATIO2 thereof is set to 2.415. Therefore, the transmission ratio width of the continuously variable transmission T is equal to RATIO2/RATIO1=5.8.

The first intermediate shaft 14 is integrally formed with first and second helical gears 17, 18. The first helical gear 17 meshes with the output gear 19 of the continuously variable transmission T, while the second helical gear 18 meshes with a third helical gear 21 which is integral with a sleeve 20 rotatably fitted on the output shaft 16. The sleeve 20 is integrally formed with a sun gear 22 of the planetary gear mechanism P. Accordingly, the crankshaft 12 of the engine E is always connected to the sun gear 22 of the planetary gear mechanism P via the input shaft 11→continuously variable transmission T→output gear 19→first helical gear 17→first intermediate shaft 14→second helical gear 18→third helical gear 21→sleeve 20. In the following, a sequence of components from the output gear 19 to the sleeve 20 disposed between the continuously variable transmission T and the sun gear 22 is referred to as "the first driving force transmission path PT1" on an as-needed basis.

The planetary gear mechanism P is comprised of the sun gear 22 (first element) integrated with the sleeve 20, a ring gear 23 (second element) integrated with the output shaft 16, and a planet carrier 26 (third element) which is integrally formed with a sleeve 24 rotatably fitted on the sleeve 20, and at the same time rotatably supports a plurality of pinions 25 simultaneously meshing with the sun gear 22 and the ring gear 23. Further, the first clutch C1 includes a clutch outer 27a integrally formed with the output shaft 16, and a clutch inner 27b integrally formed with the sleeve 20. In the planetary gear mechanism P constructed as above, when the first clutch C1 is engaged, the sun gear 22 and the ring gear 23 are integrated with each other to lock the planetary gear mechanism P, whereby the output shaft 16 is directly driven by the continuously variable transmission T.

The output shaft 16 is connected to drive wheels W, W via a final drive gear 28 integrated therewith, a final driven gear 29, and a differential gear 30. Further, the sleeve 24 is formed with a fourth helical gear 31, and a fifth helical gear 32 having a larger number of gear teeth than those of the fourth helical gear 31.

The input shaft 11 of the continuously variable transmission T has a drive sprocket 33 integrally formed therewith. The second intermediate shaft 15 has a driven sprocket 35 arranged thereon which is integrated with a sleeve 34 rotatably fitted on the second intermediate shaft 15. An endless chain 36 passes over the sprockets 33, 35. The sleeve 34 is integrally formed with respective clutch outers 37a, 38a of the second and third clutches C2, C3. This construction causes the sleeve 34, and the clutch outers 37a, 38a to always rotate at a rotational speed corresponding to a gear ratio between the sprockets 33, 35 during operation of the engine E.

The second clutch C2 has a clutch inner 37b integrally formed with the second intermediate shaft 15. A sixth helical gear 39 integrated with the second intermediate shaft 15 meshes with the fourth helical gear 31 on the sleeve 24. Therefore, when the second clutch C2 is engaged, the crankshaft 12 of the engine E is connected to the planet carrier 26 via the input shaft 11 of the continuously variable transmission T→drive sprocket 33→endless chain 36→driven sprocket 35→sleeve 34→second clutch C2→second intermediate shaft 15→sixth helical gear 39 fourth helical gear 31→sleeve 24, whereby the rotation of the engine E is transmitted to the planet carrier 26.

That is, in the present embodiment, a first gear train G1 is formed by the sixth helical gear 39 and the fourth helical gear 31. In the following, out of the components described above, a sequence of the components from the drive sprocket 33 to the sleeve 34 is referred to as "the second driving force transmission path PT2" on an as-needed basis. Further, a total transmission ratio from the crankshaft 12 to the planet carrier 26 via the second driving force transmission path PT2 and the first gear train G1 is set to be approximately equal to a total transmission ratio from the crankshaft 12 to the sun gear 22 of the planetary gear mechanism P via the continuously variable transmission T whose transmission ratio is set to the maximum speed transmission ratio RATIO1 and the first driving force transmission path PT1.

Further, the third clutch C3 has a clutch inner 38b integrally formed with a sleeve 40 rotatably fitted on the second intermediate shaft 15. A seventh helical gear 41 integrated with the sleeve 40 meshes with the above fifth helical gear 32 on the sleeve 24. Due to the above construction, when the third clutch C3 is engaged, the crankshaft 12 of the engine E is connected to the planet carrier 26 of the planetary gear mechanism P via the input shaft 11 of the continuously variable transmission T→second driving force transmission path PT2 (drive sprocket 33→endless chain 36→driven sprocket 35→sleeve 34)→third clutch C3 sleeve 40→seventh helical gear 41→fifth helical gear 32→sleeve 24, whereby the rotation of the engine E is transmitted to the planet carrier 26.

That is, in the present embodiment, a second gear train G2 is formed by the seventh helical gear 41 and the fifth helical gear 32. The seventh helical gear 41 is set to have a smaller number of gear teeth than those of the sixth helical gear 39 of the first gear train G1. Further, as described above, since the fifth helical gear 32 has a larger number of gear teeth than those of the fourth helical gear 31, the second gear train G2 is set to have a larger gear ratio (for decreasing rotational speed) than that of the first gear train G1. Further, the total transmission ratio from the crankshaft 12 to the planet carrier 26 via the second driving force transmission path PT2 and the second gear train G2 is set to be approximately equal to the total transmission ratio from the crankshaft 12 to the sun gear 22 of the planetary gear mechanism P via the continuously variable transmission T whose transmission ratio is set to the minimum speed transmission ratio RATIO2 and the first driving force transmission path PT1.

Furthermore, transmission ratios between the sun gear 22, the ring gear 23, and the pinions 25 of the planet carrier 26, of the planetary gear mechanism P are set such that when the sun gear 22 is driven for rotation with the transmission ratio of the continuously variable transmission T being set to a predetermined intermediate transmission ratio RATIOGN, and at the same time when the third clutch C3 is engaged to thereby cause the planet carrier 26 to be driven for rotation via the second gear train G2, the ring gear 23 and the output shaft 16 connected thereto are placed in a neutral state in which rotations thereof are inhibited, due to the balance between the rotation of the sun gear 22 and that of the planet carrier 26. In this state, the reduction ratio of the continuously variable transmission system 1 is infinitely large. In short, the continuously variable transmission system 1 according to the present embodiment has an IVT (infinitely variable transmission) function. Hereinafter, the above state in which the rotations of the ring gear 23 and the output shaft 16 are inhibited is referred to as "the geared neutral state".

Next, the operation of the continuously variable transmission system 1 constructed as above will be described from one transmission mode to another with reference to a velocity diagram of the planetary gear mechanism P shown in FIG. 2.

IVT Mode

In the IVT mode, the third clutch C3 is engaged, and at the same time the first and second clutches C1, C2 are disengaged. This causes the sun gear 22 of the planetary gear mechanism P to be driven for rotation via the continuously variable transmission T and the first driving force transmission path PT1, and the planet carrier 26 to be driven for rotation via the second driving force transmission path PT2 and the second gear train G2. In this state, when the transmission ratio of the continuously variable transmission T is controlled to the predetermined intermediate transmission ratio RATIOGN, the above settings of the planetary gear mechanism P place the ring gear 26 and the output shaft 16 in the geared neutral state, whereby the automotive vehicle is held in a standing state (point GN shown in FIG. 2).

To cause reverse travel of the vehicle from the geared neutral state, the transmission ratio of the continuously variable transmission T is changed in the speed-increasing direction. As a result, the rotational speed of the sun gear 22 connected to the continuously variable transmission T is increased so that the ring gear 23 rotates in a direction (indicated by arrow "RS" in FIG. 2) opposite to the direction of rotation of the sun gear 22 from the state in which the rotation of the ring gear 23 is inhibited, whereby the output shaft 16 is rotated in a reverse travel direction. The rotation of the output shaft 16 is transmitted to the drive wheels W, W via the final drive gear 28, the final driven gear 29, and the differential gear 30, to thereby cause the vehicle to start reverse travel. In this case, the torque from the engine E is transmitted to the sun gear 22 via the continuously variable transmission T and the first driving force transmission path PT1, and at the same time part of the torque is transmitted to the input shaft 11 of the continuously variable transmission T via the planet carrier 26, the second gear train G2, and the second driving force transmission path PT2, whereby torque input to the continuously variable transmission T is augmented.

On the other hand, to cause forward travel of the vehicle from the geared neutral state, the transmission ratio of the continuously variable transmission T is, changed in the speed-decreasing direction. As a result, inversely to the above case, the rotational speed of the sun gear 22 connected to the continuously variable transmission T is decreased so that the ring gear 23 rotates in the same direction (indicated by arrow "FS" in FIG. 2) as the direction of rotation of the sun gear 22 from the state in which the rotation of the ring gear 23 is inhibited, whereby the output shaft 16 is rotated in a forward travel direction, to cause the vehicle to start forward travel. In this case, the torque from the engine E is transmitted to the planet carrier 26 via the second driving force transmission path PT2 and the second gear train G2, and at the same time part of the torque is reversely transmitted from the output side of the continuously variable transmission T to the input shaft 11 via the sun gear 22 and the first driving force transmission path PT1, whereby torque input to the second driving force transmission path PT2 is augmented.

Direct Mode

Figure 2:
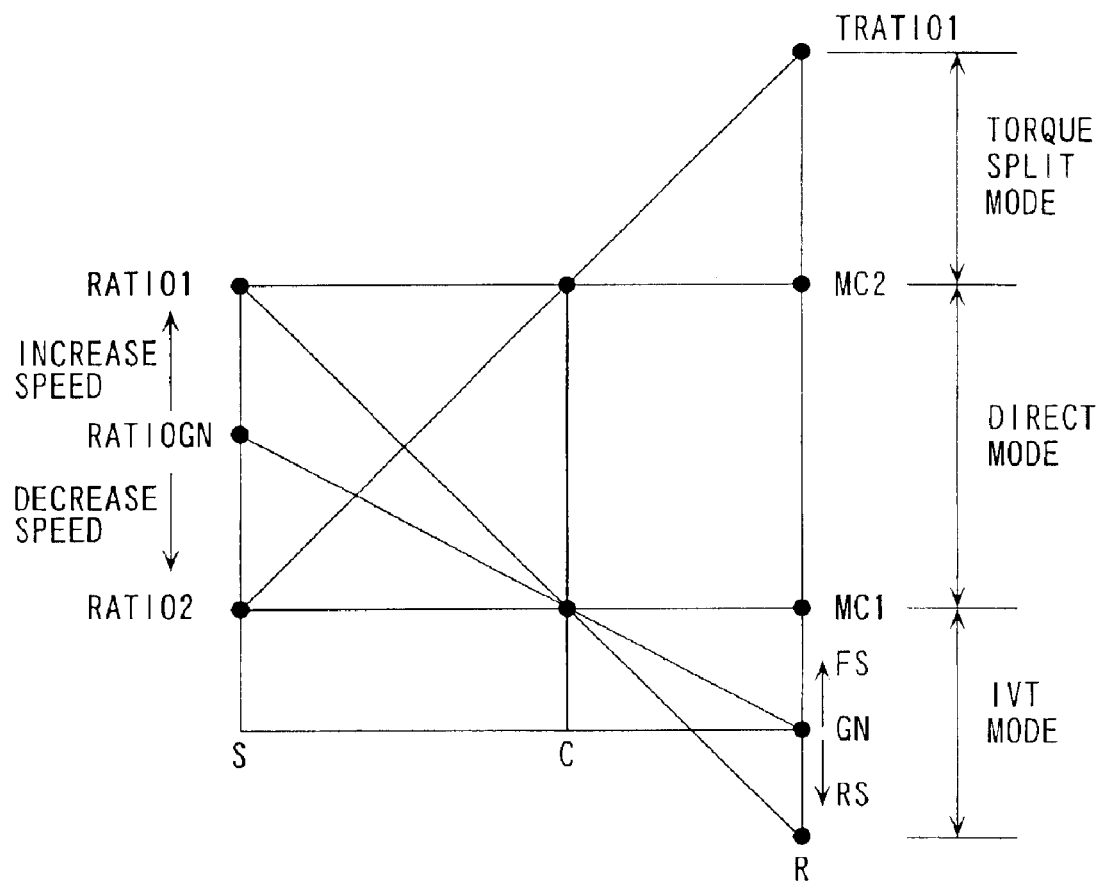
FIG. 2 is a velocity diagram of a planetary gear mechanism of the FIG. 1 continuously variable transmission system.

In the IVT mode described above, as the transmission ratio of the continuously variable transmission T is reduced to become approximately equal to the minimum speed transmission ratio RATIO2, the vehicle is accelerated to a first mode-switching point MC1 shown in FIG. 2, whereupon the first clutch C1 is engaged, and at the same time the third clutch C3 is disengaged to switch from the IVT mode to the direct mode. It should be noted that the first mode-switching point corresponds to a first-speed transmission ratio in a normal automatic transmission.

In the direct mode, since the second and third clutches C2, C3 are disengaged, the torque from the engine E is transmitted to the sun gear 22 of the planetary gear mechanism P not via the second driving force transmission path PT2 but only via the continuously variable transmission T. Further, by engaging the first clutch C1, the sun gear 22 and the ring gear 23 are integrated with each other to lock the planetary gear mechanism P, whereby the output shaft 16 is directly driven for rotation by the continuously variable transmission T and the first driving force transmission path PT1. As a result, the transmission ratio of the continuously variable transmission system 1 is determined by only the transmission ratio of the continuously variable transmission T, and becomes equal to the total transmission ratio of the continuously variable transmission T and the first driving force transmission path PT1. Therefore, when the transmission ratio of the continuously variable transmission T is changed in the speed-increasing direction, the continuously variable transmission system 1 delivers torque at a rotational speed increased in proportion thereto to further accelerate the vehicle.

As described above, when the transmission ratio of the continuously variable transmission T is reduced to become approximately equal to the minimum speed transmission ratio RATIO2 in the IVT mode, the transmission mode is switched from the IVT mode to the direct mode. As described above, the total transmission ratio of the continuously variable transmission T at the minimum speed transmission ratio RATIO2 and the first driving force transmission path PT1 is set such that it becomes approximately equal to the total transmission ratio of the second driving force transmission path PT2 and the second gear train G2, and hence it is possible to smoothly switch from the IVT mode to the direct mode such that there is no difference in rotational speed of the planet carrier 26 before and after the switching. Further, it is possible to make use of the continuously variable transmission T until the transmission ratio thereof is reduced to become approximately equal to the minimum speed transmission ratio RATIO2 in the IVT mode and start the direct mode when the transmission ratio of the continuously variable transmission T is approximately equal to the minimum speed transmission ratio RATIO2. Therefore, the continuously variable transmission T can be made use of to such an extent that the transmission ratio thereof becomes approximately equal to a speed-decreasing limit of the range (corresponding to the transmission ratio width) of available transmission ratios in both of the IVT mode and the direct mode, which makes it possible to secure a large transmission ratio range of the whole continuously variable transmission system 1.

Torque Split Mode

In the direct mode described above, as the transmission ratio of the continuously variable transmission T is increased to become approximately equal to the maximum speed transmission ratio RATIO1, the vehicle is accelerated to a second mode-switching point MC2 shown in FIG. 2, whereupon the second clutch C2 is engaged and at the same time the first clutch C1 is disengaged to switch the transmission mode to the torque split mode.

In the torque split mode, the sun gear 22 of the planetary gear mechanism P is driven for rotation via the continuously variable transmission T and the first driving force transmission path PT1, and at the same time the planet carrier 26 is driven for rotation via the second driving force transmission path PT2 and the first gear train G1 having a gear ratio smaller than that of the second gear train G2 due to the engagement of the second clutch C2. In this state, if the transmission ratio of the continuously variable transmission T is changed in the speed-decreasing direction, the rotational speed of the ring gear 23 is increased in accordance with reduction of the rotational speed of the sun gear 22 connected to the continuously variable transmission T, whereby the continuously variable transmission system 1 delivers rotation having an increased rotational speed to further accelerate the vehicle. When the transmission ratio of the continuously variable transmission T is reduced to become approximately equal to the minimum speed transmission ratio RATIO2, the maximum speed transmission ratio TRATIO1 of the continuously variable transmission system 1 can be obtained. It should be noted that in the torque split mode, the torque from the engine E is transmitted to the planet carrier 26 via the second driving force transmission path PT2 and the first gear train G1, and at the same time part of the torque is reversely transmitted from the output side of the continuously variable transmission T to the input shaft 11 via the sun gear 22 and the first driving force transmission path PT1, to thereby augment torque input to the second driving force transmission path PT2.

As described hereinbefore, when the transmission ratio of the continuously variable transmission T is changed in the speed-increasing direction until it becomes approximately equal to the maximum speed transmission ratio RATIO1 in the direct mode, the transmission mode is switched from the direct mode to the torque split mode. As described above, the total transmission ratio of the continuously variable transmission T at the maximum speed transmission ratio RATIO1 and the first driving force transmission path PT1 is set such that it becomes approximately equal to the total transmission ratio of the second driving force transmission path PT2 and the first gear train G1, and hence it is possible to smoothly switch from the direct mode to the torque split mode such that there is no difference in rotational speed of the planet carrier 26 before and after the switching. Further, it is possible to make use of the continuously variable transmission T until the transmission ratio thereof is changed to become approximately equal to the maximum speed transmission ratio RATIO1 in the direct mode and start the torque split mode when the transmission ratio of the continuously variable transmission T is approximately equal to the maximum speed transmission ratio RATIO1. Hence, the continuously variable transmission T can be made use of to such an extent that the transmission ratio width becomes approximately equal to a speed-increasing limit of the range (corresponding to the transmission ratio width) of available transmission ratios in both of the direct mode and the torque split mode. This merit and the merit of starting the direct mode when the transmission ratio of the continuously variable transmission T is approximately equal to the minimum speed transmission ratio RATIO2 make it possible to secure a larger transmission ratio range of the whole continuously variable transmission system 1. For instance, in the present embodiment, by using the continuously variable transmission T having a transmission ratio width of up to 5.8, it is possible for the whole continuously variable transmission system 1 to attain a transmission ratio width of up to 10.8, which can allow a maximum torque from the engine E.

As described hereinbefore, according to the present embodiment, the three transmission modes of the IVT mode, the direct mode, and the torque split mode can be realized by one planetary gear mechanism P. Further, the vehicle can be caused to stop, start reverse traveling, and start forward travel in the IVT mode, which makes it possible to dispense with a reverse brake or the like, thereby reducing the number of component parts of the system in comparison with the conventional system. This makes it possible to design the continuously variable transmission system 1 compact in size and manufacture the same at a reduced cost. Further, since the maximum transmission ratio width can be assigned to each of the transmission modes, the whole continuously variable transmission system 1 can secure a maximum transmission ratio width.

Although in the above embodiment, the switching from the IVT mode to the direct mode is carried out when the transmission ratio of the continuously variable transmission T is changed in the speed-decreasing direction to become approximately equal to the minimum speed transmission ratio RATIO2 in the IVT mode, this is not limitative, but since the load on the power rollers 54 is large when the transmission ratio of the continuously variable transmission T is approximately equal to the minimum speed transmission ratio RATIO2, the switching may be performed before the transmission ratio of the continuously variable transmission T becomes approximately equal to the minimum speed transmission ratio RATIO2 so as to prevent the power rollers from being damaged by the load on the power rollers 54.

Figure 3:
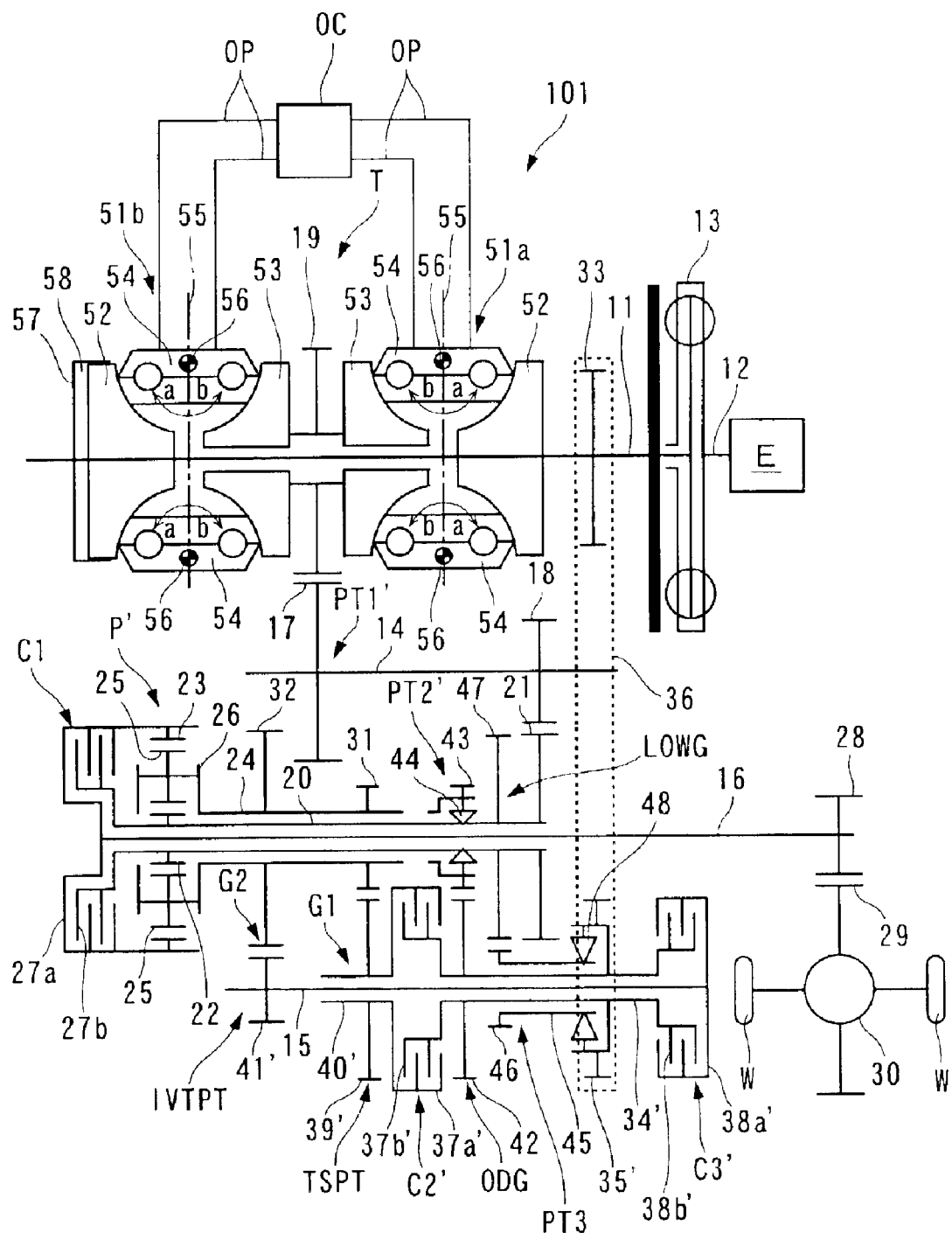
FIG. 3 is a skeleton diagram showing a continuously variable transmission system according to a second embodiment of the invention.

Next, a continuously variable transmission system 101 for an automotive vehicle, according to a second embodiment will be described with reference to FIGS. 3 to 5. It should be noted that in the following description, points different in configuration from those of the first embodiment are mainly described, with component parts and elements similar to those of the first embodiment being designated by identical reference numerals, and detailed description thereof being omitted.

In the present embodiment, the pair of power rollers 54, 54 are rotatably supported by a pair of trunnions, not shown, movable along the trunnion axis 56. The pair of trunnions are connected to a pair of oil passages OP, OP and a hydraulic control circuit OC (switching means) for actuating the trunnions. The angles of tilting of the pair of power rollers 54, 54 are made synchronous with each other, similarly to the first embodiment, by causing the hydraulic control circuit OC to control hydraulic pressure in the oil passages OP, OP. Further, the directions of tilting of the pair of power rollers 54, 54, that is, the direction in which the transmission ratio of the continuously variable transmission is changed is switched between a speed-increasing direction and a speed-decreasing direction by causing the hydraulic control circuit OC to change the direction in which hydraulic pressure in the oil passages OP, OP acts.

In the present embodiment, for instance, the maximum speed transmission ratio RATIO1 of the continuously variable transmission T at an OD (overdrive) end shown is set to 0.415, and the minimum speed transmission ratio RATIO2 thereof at a LOW end is set to 2.415. Therefore, the transmission ratio width of the continuously variable transmission T is equal to RATIO2/RATIO1=5.8.

In the present embodiment, the input shaft 11 is always connected to the sun gear 22 of the planetary gear mechanism P via the continuously variable transmission T→output gear 19→first helical gear 17→first intermediate shaft 14→second helical gear 18→third helical gear 21. In the present embodiment, out of the above components, a first driving force transmission path PT1' is formed by a sequence of components from the continuously variable transmission T to the third helical gear 21.

A clutch outer 37a' of a second clutch C2' is integrally formed with a sleeve 40' rotatably fitted on the second intermediate shaft 15. A sixth helical gear 39' integrated with the sleeve 40' meshes with the fourth helical gear 31 on the sleeve 24 integrated with the planet carrier 26. Further, a clutch inner 37b' of the second clutch C2' is integrally formed with a sleeve 34' integrated with a driven sprocket 35' having an endless chain 36 passing thereover. Accordingly, when the second clutch C2' is engaged, the input shaft 11 is connected to the planet carrier 26 of a planetary gear mechanism P' via the drive sprocket 33'→endless chain 36→driven sprocket 35'→sleeve 34'→second clutch C2' sleeve 40'→sixth helical gear 39'→fourth helical gear 31, whereby the rotation of the engine E is transmitted to the planet carrier 26.

Out of the components described above, a sequence of the components from the drive sprocket 33 to the first gear train G1 via the second clutch C2' is referred to as "the torque split driving force transmission path TSPT" on an as-needed basis. The total transmission ratio of the torque split driving force transmission path TSPT is set to be approximately equal to the total transmission ratio of the first driving force transmission path PT1' including the continuously variable transmission T whose transmission ratio is at its OD end.

A clutch outer 38a' of a third clutch C3' is integrally formed with the second intermediate shaft 15, and a seventh helical gear 41' integrated with the second intermediate shaft 15 meshes with the fifth helical gear 32 on the sleeve 24. Due to this construction, when the third clutch C3' is engaged, the input shaft 11 is connected to the planet carrier 26 of the planetary gear mechanism P' via the drive sprocket 33→endless chain 36→driven sprocket 35' sleeve 34'→third clutch C3'→second intermediate shaft 15→seventh helical gear 41'→fifth helical gear 32, whereby the rotation of the engine E is transmitted to the planet carrier 26.

Out of the components described above, a sequence of the components from the drive sprocket 33 to the second gear rain G2 via the third clutch C3' is referred to as "the IVT driving force transmission path IVTPT" on an as-needed basis. The total transmission ratio of the IVT driving force transmission path IVTPT is set to be approximately equal to the total transmission ratio of the first driving force transmission path PT1' including the continuously variable transmission T whose transmission ratio is at its LOW end.

Further, the sleeve 34' has an OD end protection gear ODG provided therefor. The OD end protection gear ODG is comprised of an eighth helical gear 42 integrated with the sleeve 34', and a ninth helical gear 43 meshing with the eighth helical gear 42. The ninth helical gear 43 is engaged with the sleeve 20 integrated with the sun gear 22 via a first one-way clutch 44. Therefore, the input shaft 11 is connected to the sun gear 22 via the drive sprocket 33→endless chain 36→driven sprocket 35'→sleeve 34'→OD end protection gear ODG (eighth helical gear 42→ninth helical gear 43)→first one-way clutch 44. In the present embodiment, out of the components described above, a sequence of the components from the drive sprocket 33 to the ninth helical gear 43 of the OD end protection gear ODG form a second driving force transmission path PT2'.

The gear ratio of the OD end protection gear ODG is set to be equal to that of the first gear train GI, and hence similarly to the case of the torque split driving force transmission path TSPT, the total transmission ratio of the second driving force transmission path PT2' is approximately equal to the total transmission ratio of the first driving force transmission path PT1' including the continuously variable transmission T whose transmission ratio is at its OD end. Due to this construction, the ninth helical gear 43 always rotates at a rotational speed corresponding to the total transmission ratio of the second driving force transmission path PT2' during operation of the engine E. Further, the first one-way clutch 44 is arranged such that it is engaged to lock between the sun gear 22 and the ninth helical gear 43 only when the rotational speed of the sun gear 22 exceeds that of the ninth helical gear 43, to allow transmission of torque, whereas when the rotational speed of the sun gear 22 is equal to or smaller than that of the ninth helical gear 43, the first one-way clutch 44 inhibits the transmission of the torque by causing the sun gear 22 and the input shaft 11 to freely rotate without being engaged with each other.

Further, the sleeve 34' has a LOW end protection gear LOWG provided therefor. The LOW end protection gear LOWG is comprised of a tenth helical gear 46 integrated with the sleeve 45 rotatably fitted on the sleeve 34', and an eleventh helical gear 47 meshing with the tenth helical gear 46 and integrated with the sleeve 20. Arranged between the sleeves 34', 45 is a second one-way clutch 48. Therefore, the input shaft 11 is connected to the sun gear 22 via the drive sprocket 33→endless chain 36→driven sprocket 35'→sleeve 34'→second one-way clutch 45→sleeve 45→LOW end protection gear LOWG (tenth helical gear 46→eleventh helical gear 47). In the present embodiment, out of the components described above, a sequence of the components from the drive sprocket 33 to the eleventh helical gear 47 of the LOW end protection gear LOWG form a third driving force transmission path PT3.

The gear ratio of the LOW end protection gear LOWG is set to be equal to that of the second gear train G2, and hence similarly to the case of the IVT driving force transmission path IVTPT, the total transmission ratio of the third driving force transmission path PT3 is approximately equal to the total transmission ratio of the first driving force transmission path PT1' including the continuously variable transmission T whose transmission ratio is at its LOW end. Further, the second one-way clutch 48 is arranged such that it is engaged to lock between the sun gear 22 and the input shaft 11 for transmission of the engine torque only when the rotational speed of the sleeve 45 is lower than that of the sleeve 34', to allow transmission of torque, whereas when the rotational speed of the sleeve 45 is equal to or larger than that of the sleeve 34', the second one-way clutch 48 inhibits the transmission of the torque by causing the sun gear 22 and the input shaft 11 to freely rotate without being engaged with each other.

Next, the operation of the continuously variable transmission system 101 constructed as above will be described from one transmission mode to another with reference to a velocity diagram of the planetary gear mechanism P shown in FIG. 4.

IVT Mode

The IVT mode according to the present embodiment is distinguished from the IVT mode according to the first embodiment in that the planet carrier 26 is driven for rotation via the IVT driving force transmission path IVTPT including the second gear train G2.

Similarly to the first embodiment, to cause reverse travel of the vehicle from the geared neutral state, the transmission ratio of the continuously variable transmission T is changed in the speed-increasing direction. In this reverse travel status of the vehicle, if the transmission ratio of the continuously variable transmission T is changed in the speed-increasing direction, the reverse travel of the vehicle is accelerated.

After that, when an accelerator pedal is released during the reverse travel of the vehicle, engine brake is applied to the vehicle with a counter torque acting on the output side of the continuously variable transmission T via the ring gear 23, the sun gear 22, and the first driving force transmission path PT1', so as to maintain the rotations of the drive wheels W, whereby the power rollers 54 are tilted in the speed-increasing direction to bring the transmission ratio of the continuously variable transmission T to its OD end. As described hereinabove, the total transmission ratio of the first driving force transmission path PT1' including the continuously variable transmission T whose transmission ratio is at its OD end is set to be approximately equal to the total transmission ratio of the second driving force transmission path PT2' including the OD end protection gear ODG. Therefore, unless the transmission ratio of the continuously variable transmission T exceeds the OD end, the rotational speed of the sun gear 22 does not exceed that of the ninth helical gear 43 of the OD end protection gear ODG. As a result, the first one-way clutch 44 remains disengaged, whereby the clutch 44 is caused to freely rotate with respect to the sun gear 22 without exerting any adverse influence on the rotation of the sun gear 22.

When the transmission ratio of the continuously variable transmission T is in the vicinity of its OD end, if the drive wheels W are accelerated in rotation than expected, e.g. due to a sudden float of the drive wheels W from a road surface, or a sudden change from an uphill road surface to a downhill road surface, torque from the drive wheels W is applied to the sun gear 22 in a manner further increasing the rotational speed of the sun gear 22, and the torque is transmitted to the output side of the continuously variable transmission T, attempting to cause the transmission ratio of the transmission T to exceed the OD end. In this case, according to the present embodiment, since the rotational speed of the sun gear 22 becomes higher than that of the ninth helical gear 43 of the OD end protection gear ODG, the first one-way clutch 44 is engaged (see ▽OW1 in FIG. 4), whereby the torque is transmitted to the input shaft 11 via the second driving force transmission path PT2' including the OD end protection gear ODG. As a result, the ratio of respective rotational speeds of the input and output discs 52, 53 is maintained, and the transmission ratio of the continuously variable transmission T is held such that it does not exceed the OD end and at the same time only an expected amount of torque is transmitted to the continuously variable transmission T to thereby protect the OD end of the transmission T.

To cause forward travel of the vehicle from the geared neutral state, similarly to the first embodiment, the transmission ratio of the continuously variable transmission T is changed in the speed-increasing direction. In this forward travel status of the vehicle, if the transmission ratio of the continuously variable transmission T is changed in the speed-decreasing direction, the forward travel of the vehicle is accelerated.

The protection of the LOW end during the forward travel of the vehicle is carried out by the LOW end protection gear LOWG and the second one-way clutch 48, similarly to the above case of the reverse travel of the vehicle. More specifically, when the accelerator pedal is released during forward travel of the vehicle, engine brake is applied to the vehicle with a counter torque acting on the output side of the continuously variable transmission T so as to maintain the rotations of the drive wheels W, whereby the power rollers 54 are tilted in the speed-decreasing direction to bring the transmission ratio of the continuously variable transmission T to its OD end. As described hereinabove, the total transmission ratio of the first driving force transmission path PT1' including the continuously variable transmission T whose transmission ratio is at its LOW end is set to be approximately equal to the total transmission ratio of the third driving force transmission path PT3 including the LOW end protection gear LOWG. Therefore, unless the transmission ratio of the continuously variable transmission T exceeds the LOW end, the rotational speed of the tenth helical gear 46 of the LOW end protection gear LOWG connected to the sun gear 22 does not become lower than that of the sleeve 34'. As a result, the second one-way clutch 48 remains disengaged to freely rotate with respect to the sun gear 22.

When the transmission ratio of the continuously variable transmission T is in the vicinity of the LOW end, if the drive wheels W are accelerated in rotation more than expected, torque from the drive wheels W is applied to the sun gear 22 in a manner decreasing the rotational speed of the sun gear 22, and the torque is transmitted to the output side of the continuously variable transmission T, attempting to cause the transmission ratio of the transmission T to exceed the LOW end. In this case, the rotational speed of the tenth helical gear 46 of the LOW end protection gear LOWG becomes lower that of the sleeve 34', and the second one-way clutch 48 is engaged (see ΔOW2 in FIG. 4), whereby part of the torque of the input shaft 11 is transmitted to the sun gear 22 via the third driving force transmission path PT3 including the LOW end protection gear LOWG. As a result, the ratio of respective rotational speeds of the input and output discs 52, 53 is maintained, and the transmission ratio of the continuously variable transmission T is held such that it does not exceed the low end, with only an expected amount of torque being transmitted to the continuously variable transmission T to thereby protect the LOW end of the transmission T.

Direct Mode

Figure 4:
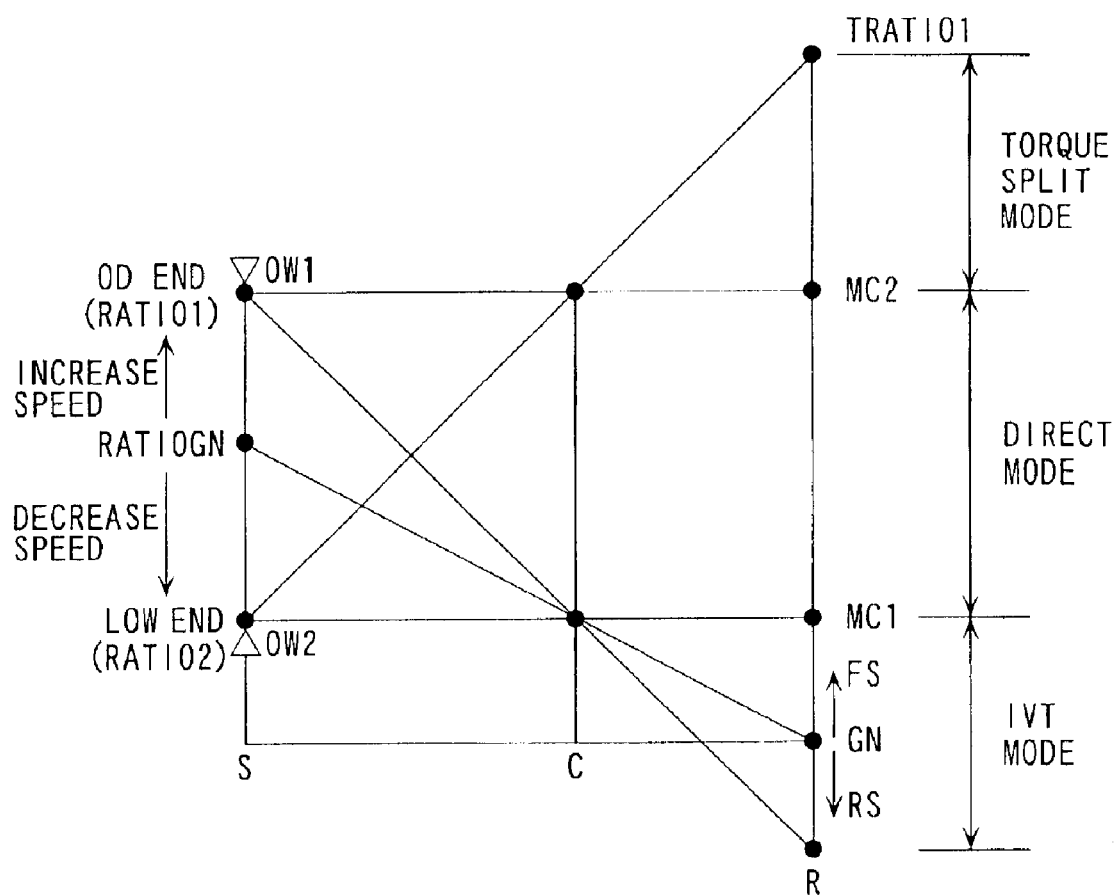
FIG. 4 is a velocity diagram of a planetary gear mechanism of the FIG. 3 continuously variable transmission system.

In the above IVT mode, as the transmission ratio of the continuously variable transmission T is changed in the speed-decreasing direction to become approximately equal to the LOW end, the vehicle is accelerated in the forward travel direction to a first mode-switching point MC1 shown in FIG. 4, whereupon the first clutch C1 is engaged, and the third clutch C3' is disengaged, whereby the transmission mode is changed to the direct mode. The first mode-switching point MC1 corresponds to a first-speed transmission ratio of the normal automatic transmission. It should be noted that torque attempting to cause the transmission ratio of the transmission T to exceed the LOW end is applied to the continuously variable transmission T during the switching of the transmission mode, the protection of the LOW end is carried out by the LOW end protection gear LOWG in the same manner as described above.

In this direct mode, the torque from the engine E is transmitted not to the planet carrier 26 of the planetary gear mechanism P' but only to the sun gear 22 via the first driving force transmission path PT1' including the continuously variable transmission T.

As described above, when the transmission ratio of the continuously variable transmission T is changed in the speed-decreasing direction to become approximately equal to its LOW end in the IVT mode, the transmission mode is switched to the direct mode. As described hereinabove, the total transmission ratio of the first driving force transmission path PT1' to be assumed when the transmission ratio of the continuously variable transmission T is at its LOW end is set such that it becomes approximately equal to the total transmission ratio of the IVT driving force transmission path IVTPT including the second gear train G2, and hence it is possible to smoothly switch from the IVT mode to the direct mode such that there is no difference in rotational speed of the planet carrier 26 before and after execution of the switching. Further, it is possible to make use of the continuously variable transmission T until the transmission ratio thereof becomes approximately equal to the LOW end in the IVT mode and start the direct mode when the transmission ratio of the continuously variable transmission T is approximately equal to the LOW end. Therefore, the continuously variable transmission T can be made use of to such an extent that the transmission ratio thereof is close to a speed-decreasing limit of the range (corresponding to the transmission ratio width) of available transmission ratios in both of the IVT mode and the direct mode. The protection of the LOW end of the continuously variable transmission T during switching of the transmission mode is reliably carried out by the LOW end protection gear LOWG.

Torque Split Mode

In the direct mode described above, as the transmission ratio of the continuously variable transmission T is increased to its OD end, the vehicle is accelerated to a second mode-switching point MC2 shown in FIG. 4, whereupon the second clutch C2 is engaged and at the same time the first clutch C1 is disengaged, whereby the transmission mode is switched to the torque split mode. If torque attempting to cause the transmission ratio of the transmission T to exceed the OD end is applied to the continuously variable transmission T before or after execution of switching of the transmission mode, the protection of the OD end is carried out by the OD end protection gear LOWG in the same manner as described above.

In the torque split mode, the sun gear 22 of the planetary gear mechanism P' is driven for rotation via the first driving force transmission path PT1 including the continuously variable transmission T, and at the same time the planet carrier 26 is driven for rotation via the torque split driving force transmission path TSPT including the first gear train G1. In this state, if the transmission ratio of the continuously variable transmission T is changed in the speed-decreasing direction, the rotational speed of the ring gear 23 is increased in accordance with reduction of the rotational speed of the sun gear 22, whereby the continuously variable transmission system 101 delivers torque at an increased rotational speed to further accelerate the vehicle. When the transmission ratio of the continuously variable transmission T is reduced to become approximately equal to its LOW end, the maximum speed transmission ratio TRATIO1 of the continuously variable transmission system 101 can be obtained. At this time, if torque attempting to cause the transmission ratio of the transmission T to exceed the LOW end is applied to the continuously variable transmission T, the protection of the LOW end is similarly carried out by the LOW end protection gear LOWG.

As described above, when the transmission ratio of the continuously variable transmission T is increased to become approximately equal to the OD end in the direct mode, the transmission mode is switched to the torque split mode. As described hereinabove, the total transmission ratio of the first driving force transmission path PT1' to be assumed when the transmission ratio of the continuously variable transmission T is at its LOW end is set such that it is approximately equal to the total transmission ratio of the torque split driving force transmission path TSPT including the first gear train G1, and hence it is possible to smoothly switch from the direct mode to the torque split mode such that there is no difference in rotational speed of the planet carrier 26 before and after the switching. Further, it is possible to make use of the continuously variable transmission T until the transmission ratio thereof becomes approximately equal to the OD end in the direct mode and start the torque split mode when the transmission ratio of the continuously variable transmission T is approximately equal to the OD end. Hence, the continuously variable transmission T can be made use of to such an extent that the transmission ratio thereof becomes approximately equal to a speed-increasing limit of the range (corresponding to the transmission ratio width) of available transmission ratios in both of the direct mode and the torque split mode. The protection of the OD end of the continuously variable transmission T during switching of the transmission mode is reliably carried out by the OD end protection gear ODG. Therefore, this merit and the merit of starting the direct mode when the transmission ratio of the continuously variable transmission T is approximately equal to the LOW end make it possible to maximize the range (corresponding to the transmission ratio width) of available transmission ratios of the whole continuously variable transmission system 101. For instance, in the present embodiment, by using the continuously variable transmission T having a transmission ratio width of 5.8, the whole continuously variable transmission system 101 can attain a transmission ratio width of 10.8, which can allow a maximum torque from the engine E.

Figure 5:
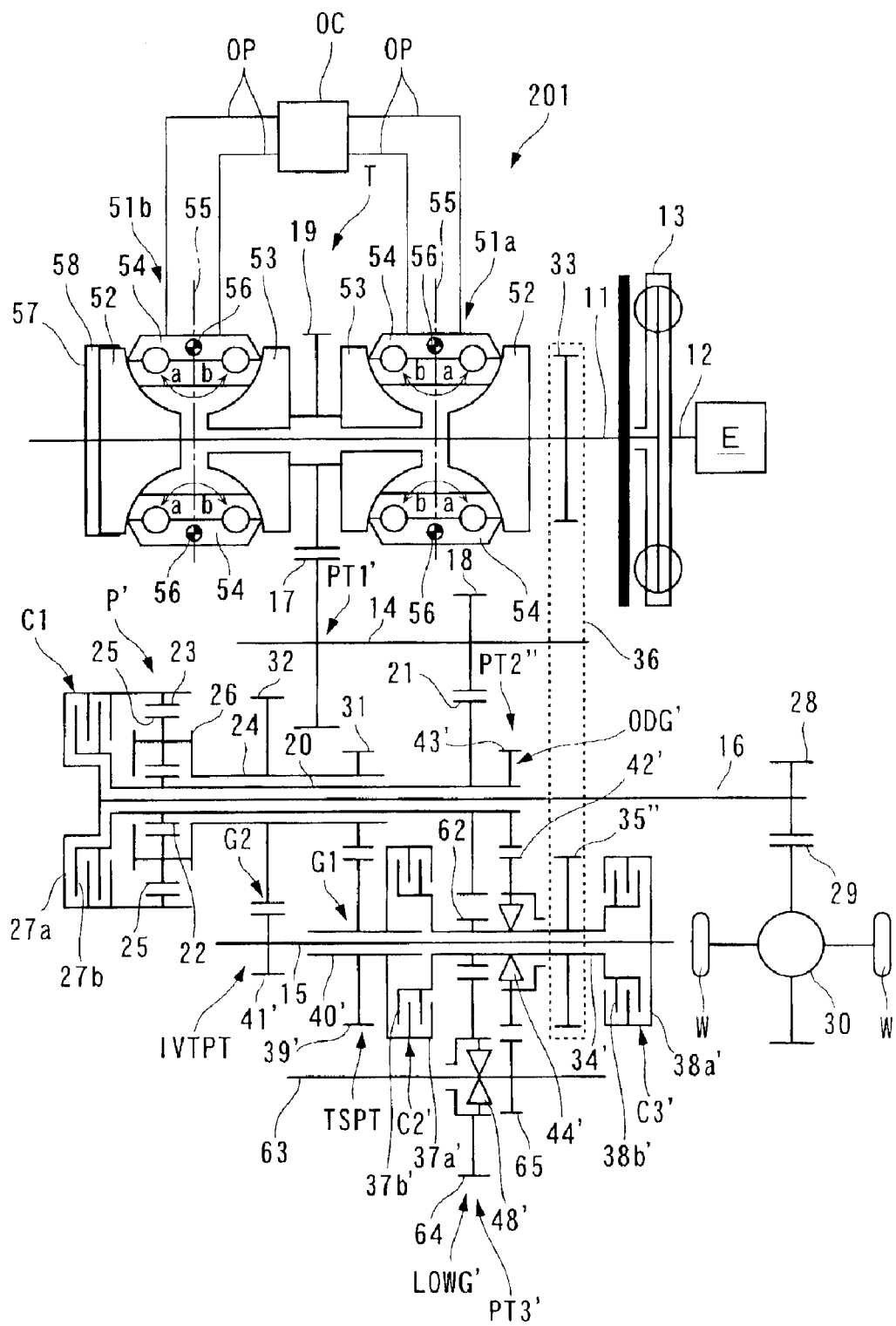
FIG. 5 is a skeleton diagram showing a continuously variable transmission system according to a third embodiment of the invention.

FIG. 5 shows a continuously variable transmission system 201 according to a third embodiment of the invention. The continuously variable transmission system 201 is distinguished from the continuously variable transmission system 101 according to the second embodiment, described hereinbefore, in the constructions of an OD end protection gear ODG' and a LOW end protection gear LOWG' from the corresponding gears ODG and LOWG of the second embodiment, particularly in layouts thereof. In the following, component parts and elements similar to those of the second embodiment are designated by identical reference numerals, and points different in configuration from those of the second embodiment are mainly described. Similarly to the OD end protection gear ODG according to the second embodiment, the OD end protection gear ODG' according to the present embodiment is comprised of eighth and ninth helical gears 42', 43'. The eighth helical gear 42' is engaged with the sleeve 34' via a first one-way clutch 44', and the ninth helical gear 43' is integrally formed with the sleeve 20. The gear ratio of the OD end protection gear ODG' and the direction of action of the first one-way clutch 44' are the same as those in the second embodiment.

Further, the LOW end protection gear LOWG' is comprised of a twelfth helical gear 62 integrated with the sleeve 34', a thirteenth helical gear 64 meshing with the twelfth helical gear 62 and engaged with an idle shaft 63 via a second one-way clutch 48', and a fourteenth helical gear 65 integrally formed with the idle shaft 63 and meshing with the eighth helical gear 42' of the OD end protection gear ODG'. The direction of action of the second one-way clutch 48' is the same as that of action of the second one-way clutch 48 in the second embodiment. More specifically, in the present embodiment, the OD end protection gear ODG' is used as part of the driving force transmission path for the LOW end protection gear LOWG', and the total transmission ratio of a third driving force transmission path PT3' including the protection gears LOWG', ODG' is set to be equal to that of the third driving force transmission path PT3 of the second embodiment.

Therefore, similarly to the second embodiment, when torque attempting to cause the transmission ratio of the transmission T to exceed the OD end is applied to the continuously variable transmission T, the first one-way clutch 44' is engaged to thereby protect the OD end. Further, when torque attempting to cause the transmission ratio of the transmission T to exceed the LOW end is generated, the second one-way clutch 48' is engaged, whereby part of the torque is transmitted to the input shaft 11 via the third driving force transmission path PT3' including the OD end protection gear ODG' and the LOW end protection gear LOWG', to thereby protect the LOW end. As described above, according to the continuously variable transmission system 201 of the third embodiment, it is possible to obtain quite the same advantageous effects as provided by the continuously variable transmission system 101 according to the second embodiment. Further, since the OD end protection gear ODG' is employed as part of the driving force transmission path for the LOW end protection gear LOWG, it is possible to shorten the axial length of the continuously variable transmission system 201, thereby manufacturing the system compact in size.

It should be noted that the invention is not limited to the embodiments described above, but it can be practiced in various ways. For instance, although in the second and third embodiments, both of the OD end and LOW end of the continuously variable transmission T are protected by the OD end protection gear ODG (ODG') and the LOW end protection gear LOWG (LOWG'), this is not limitative, but only one of the OD end and the LOW end may be protected by one of the protection gears ODG (ODG'), LOWG (LOWG'). Further, although in these embodiments, timings of operations of the OD end protection gear ODG (ODG') and the LOW end protection gear LOWG (LOWG') are set to the OD end and LOW end of the transmission ratio of the continuously variable transmission T, respectively, this is not limitative, but one or both of the timings of operations may be set to a predetermined transmission ratio or predetermined transmission ratios slightly before the OD end and LOW end of the continuously variable transmission T, which is also within the scope of the invention.

Further, although in the second and third embodiments, the second and third driving force transmission paths PT2' (PT2"), PT3 (PT3') are connected and disconnected by setting respective transmission ratios thereof and by using one-way clutches, this is not limitative, but other suitable methods may be employed. For instance, the second and third driving force transmission paths PT2' (PT2", PT3' (PT3') may be provided with solenoid clutches and the rotational speeds of the input and output discs 52, 53 may be detected to engage and disengage the solenoid clutches depending on the detected rotational speeds.

It is further understood by those skilled in the art that the foregoing is a preferred embodiment of the invention, and that various changes and modifications may be made without departing from the spirit and scope thereof.

What is claimed is:

1. A continuously variable transmission system for a vehicle, comprising:
   a toroidal continuously variable transmission having an input shaft connected to an output shaft of a prime mover, an input member mounted on said input shaft, and an output member for outputting rotation of said input member at a continuously variable transmission ratio;
   a planetary gear mechanism having a first element connected to said output member of said toroidal continuously variable transmission, a second element connected to drive wheels via a second output shaft, and a third element;
   a first clutch for establishing and releasing connection between said first element and said second element of said planetary gear mechanism;
   rotational shafts having axes spaced apart in a radial direction and parallel to the axis of said input shaft and to the axis of said output shaft of said prime mover;
   a first gear train having a first gear ratio, arranged between said output shaft of the prime mover and said third element of said planetary gear mechanism and mounted on said rotational shafts, for transmitting rotation of said output shaft of the prime mover to said third element of said planetary gear mechanism;
   a second clutch for establishing and releasing at least one of connection between said first gear train and said output shaft of the prime mover and connection between said first gear train and said third element of said planetary gear mechanism;
   a second gear train having a second gear ratio larger than the first gear ratio of said first gear train, arranged between said output shaft of the prime mover and said third element of said planetary gear mechanism in parallel with said first gear train and mounted on said rotational shafts, for transmitting the rotation of said output shaft of the prime mover to said third element of said planetary gear mechanism; and
   a third clutch for establishing and releasing at least one of connection between said second gear train and said output shaft of the prime mover and connection between said second gear train and said third element of said planetary gear mechanism.

2. A continuously variable transmission system according to claim 1, wherein a total transmission ratio from said output shaft of the prime mover to said third element of said planetary gear mechanism via said first gear train, and a total transmission ratio from said output shaft of the prime mover to said first element of said planetary gear mechanism via said toroidal continuously variable transmission at a maximum speed transmission ratio are configured to be approximately equal to each other.

3. A continuously variable transmission system according to claim 2, including a connecting mechanism for connecting said output shaft of the prime mover to said second element of said planetary gear mechanism when a rotational speed of the drive wheels becomes higher than a rotational speed which the drive wheels should have when said toroidal continuously variable transmission is at the maximum speed transmission ratio.

4. A continuously variable transmission system according to claim 1, wherein a total transmission ratio from said output shaft of the prime mover to said third element of said planetary gear mechanism via said second gear train, and a total transmission ratio from said output shaft of the prime mover to said first element of said planetary gear mechanism via said toroidal continuously variable transmission at a minimum speed transmission ratio are configured to be approximately equal to each other.

5. A continuously variable transmission system according to claim 4, including a connecting mechanism for connecting said output shaft of the prime mover to said second element of said planetary gear mechanism when a rotational speed of the drive wheels becomes lower than a rotational speed which the drive wheels should have when said toroidal continuously variable transmission is at the minimum speed transmission ratio.

6. A continuously variable transmission system for a vehicle, comprising:
   a toroidal continuously variable transmission having an input member connected to an output shaft of a prime mover, and an output member for outputting rotation of said input member at a continuously variable transmission ratio;
   a planetary gear mechanism having a first element connected to said output member of said toroidal continuously variable transmission, a second element connected to drive wheels, and a third element;
   a first clutch for establishing and releasing connection between said first element and said second element of said planetary gear mechanism;
   a first gear train having a first gear ratio and arranged between said output shaft of the prime mover and said third element of said planetary gear mechanism, for transmitting rotation of said output shaft of the prime mover to said third element of said planetary gear mechanism;
   a second clutch for establishing and releasing at least one of connection between said first gear train and said output shaft of the prime mover and connection between said first gear train and said third element of said planetary gear mechanism;
   a second gear train having a second gear ratio larger than the first gear ratio of said first gear train and arranged between said output shaft of the prime mover and said third element of said planetary gear mechanism in parallel with said first gear train, for transmitting the rotation of said output shaft of the prime mover to said third element of said planetary gear mechanism; and
   a third clutch for establishing and releasing at least one of connection between said second gear train and said output shaft of the prime mover and connection between said second gear train and said third element of said planetary gear mechanism,
   wherein a total transmission ratio from said output shaft of the prime mover to said third element of said planetary gear mechanism via said first gear train, and a total transmission ratio from said output shaft of the prime mover to said first element of said planetary gear mechanism via said toroidal continuously variable transmission at a maximum speed transmission ratio are configured to be approximately equal to each other,
   including a connecting mechanism for connecting said output shaft of the prime mover to said second element of said planetary gear mechanism when a rotational speed of the drive wheels becomes higher than a rotational speed which the drive wheels should have when said toroidal continuously variable transmission is at the maximum speed transmission ratio, and
   wherein said connecting mechanism includes a one-way clutch.

7. A continuously variable transmission system for a vehicle, for transmitting a driving force from an output shaft of a prime mover to drive wheels at a continuously variable transmission ratio:

the continuously variable transmission system comprising:

a first driving force transmission path including a second output shaft connected to the drive wheels, and a toroidal continuously variable transmission that has an input shaft connected to the prime mover and power rollers, and outputs the driving force input to said input shaft from the prime mover at said continuously variable transmission ratio achieved by tilting of said power rollers which are rotated, via said second output shaft to the drive wheels;

switching means for switching a direction in which said toroidal continuously variable transmission changes the continuously variable transmission ratio, between a speed-increasing direction and a speed-decreasing direction, in at least one of a predetermined speed-increasing range of transmission ratios and a predetermined speed-decreasing range of transmission ratios; and rotational shafts having axes spaced apart in a radial direction and parallel to the axis of said input shaft and to the axis of said output shaft of said prime mover;

an auxiliary driving force transmission path having a gear train mounted on said rotational shafts, for connecting the prime mover and said second output shaft in at least one of a case where a rotational speed of said second output shaft becomes larger than a rotational speed corresponding to a first predetermined transmission ratio of said toroidal continuously variable transmission within the predetermined speed-increasing range and a case where the rotational speed of said output shaft becomes lower than a rotational speed corresponding to a second predetermined transmission ratio of said toroidal continuously variable transmission within the predetermined speed-decreasing range.

8. A continuously variable transmission system according to claim 7, wherein the toroidal continuously variable transmission has an output member for outputting the driving force, and wherein the continuously variable transmission system includes:

a planetary gear mechanism having a first element connected to said output member, a second element connected to the drive wheels, and a third element;

a first clutch for establishing and releasing connection between said first element and said second element of said planetary gear mechanism;

a first gear train having a first gear ratio and arranged between the prime mover and said third element of said planetary gear mechanism, for transmitting the driving force of the prime mover to said third element of said planetary gear mechanism;

a second clutch for establishing and releasing at least one of connection between said first gear train and the prime mover and connection between said first gear train and said third element of said planetary gear mechanism;

a second gear train having a second gear ratio larger than the first gear ratio of said first gear train and arranged between the prime mover and said third element of said planetary gear mechanism in parallel with said first gear train, for transmitting the driving force of the prime mover to said third element of said planetary gear mechanism; and a third clutch for establishing and releasing at least one of connection between said second gear train and the prime mover and connection between said second gear train and said third element of said planetary gear mechanism.

9. A continuously variable transmission system according to claim 7, wherein said auxiliary driving force transmission path comprises a second driving force transmission path for connecting the prime mover and said second output shaft when the rotational speed of said second output shaft becomes higher than the rotational speed corresponding to the first predetermined transmission ratio of said toroidal continuously variable transmission within the predetermined speed-increasing range.

10. A continuously variable transmission system according to claim 9, wherein a total transmission ratio of said second driving force transmission path is configured to be approximately equal to a total transmission ratio of said first driving force transmission path to be assumed when said toroidal continuously variable transmission is at the first predetermined transmission ratio within the predetermined speed-increasing range, and a first one-way clutch is arranged in said second driving force transmission path.

11. A continuously variable transmission system according to claim 10, wherein the first predetermined transmission ratio is a maximum speed transmission ratio.

12. A continuously variable transmission system according to claim 7, wherein said auxiliary driving force transmission path comprises a third driving force transmission path for connecting the prime mover and said second output shaft when the rotational speed of said second output shaft becomes lower than the rotational speed corresponding to the second predetermined transmission ratio of said toroidal continuously variable transmission within the predetermined speed-decreasing range.

13. A continuously variable transmission system according to claim 12, wherein a total transmission ratio of said third driving force transmission path is configured to be approximately equal to a total transmission ratio of said first driving force transmission path to be assumed when said toroidal continuously variable transmission is at the second predetermined transmission ratio within the predetermined speed-decreasing range, and a second one-way clutch is arranged in said third driving force transmission path.

14. A continuously variable transmission system according to claim 13, wherein the second predetermined transmission ratio is a minimum speed transmission ratio.

15. A continuously variable transmission system for a vehicle, comprising:

a toroidal continuously variable transmission having an input member connected to an output shaft of a prime mover, and an output member for outputting rotation of said input member at a continuously variable transmission ratio;

a planetary gear mechanism having a first element connected to said output member of said toroidal continuously variable transmission, a second element connected to drive wheels, and a third element;

a first clutch for establishing and releasing connection between said first element and said second element of said planetary gear mechanism;

a first gear train having a first gear ratio and arranged between said output shaft of the prime mover and said third element of said planetary gear mechanism, for transmitting rotation of said output shaft of the prime mover to said third element of said planetary gear mechanism;

a second clutch for establishing and releasing at least one of connection between said first gear train and said output shaft of the prime mover and connection between said first gear train and said third element of said planetary gear mechanism;

a second gear train having a second gear ratio larger than the first gear ratio of said first gear train and arranged between said output shaft of the prime mover and said third element of said planetary gear mechanism in parallel with said first gear train, for transmitting the rotation of said output shaft of the prime mover to said third element of said planetary gear mechanism; and a third clutch for establishing and releasing at least one of connection between said second gear train and said output shaft of the prime mover and connection between said second gear train and said third element of said planetary gear mechanism, wherein a total transmission ratio from said output shaft of the prime mover to said third element of said planetary gear mechanism via said second gear train, and a total transmission ratio from said output shaft of the prime mover to said first element of said planetary gear mechanism via said toroidal continuously variable transmission at a minimum speed transmission ratio are configured to be approximately equal to each other, including a connecting mechanism for connecting said output shaft of the prime mover to said second element of said planetary gear mechanism when a rotational speed of the drive wheels becomes lower than a rotational speed which the drive wheels should have when said toroidal continuously variable transmission is at the minimum speed transmission ratio, and wherein said connecting mechanism includes a one-way clutch.

* * * * *